(12) United States Patent
Chen et al.

(10) Patent No.: US 8,455,576 B2
(45) Date of Patent: Jun. 4, 2013

(54) HALOGEN FREE, FLAME RETARDANT COMPOSITIONS FOR WIRE AND CABLE APPLICATIONS

(75) Inventors: Given Jing Chen, Shanghai (CN); Wilson Xiao Wei Yan, Hangzhou (CN); Lan Lu, Shanghai (CN); Bin Li, Shanghai (CN); David Hong Fei Guo, Shanghai (CN); Lotus Hua Huang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/513,893

(22) PCT Filed: Dec. 18, 2009

(86) PCT No.: PCT/CN2009/075727
§ 371 (c)(1),
(2), (4) Date: Jun. 5, 2012

(87) PCT Pub. No.: WO2011/072459
PCT Pub. Date: Jun. 23, 2011

(65) Prior Publication Data
US 2012/0244305 A1    Sep. 27, 2012

(51) Int. Cl.
*C08K 5/523*    (2006.01)
(52) U.S. Cl.
USPC .............................. 524/127; 524/99; 524/100
(58) Field of Classification Search
USPC ..................... 524/99, 100, 127; 174/110 SR
See application file for complete search history.

(56) References Cited

U.S. PATENT DOCUMENTS

| | | | |
|---|---|---|---|
| 3,214,409 A | 10/1965 | Peerman | |
| 3,236,917 A | 2/1966 | Natta et al. | |
| 4,385,133 A | 5/1983 | Alberino et al. | |
| 4,522,975 A | 6/1985 | O'Connor et al. | |
| 4,950,541 A | 8/1990 | Tabor et al. | |
| 5,167,899 A | 12/1992 | Jezic | |
| 5,194,509 A | 3/1993 | Hasenbein et al. | |
| 5,272,236 A | 12/1993 | Lai et al. | |
| 5,278,272 A | 1/1994 | Lai et al. | |
| 5,986,028 A | 11/1999 | Lai et al. | |
| 7,355,089 B2 | 4/2008 | Chang et al. | |
| 7,504,347 B2 | 3/2009 | Poon et al. | |
| 7,524,911 B2 | 4/2009 | Karjala et al. | |
| 7,579,408 B2 | 8/2009 | Walton et al. | |
| 7,582,716 B2 | 9/2009 | Liang et al. | |
| 2006/0199930 A1 | 9/2006 | Shan et al. | |

FOREIGN PATENT DOCUMENTS

WO    2005090427    9/2005

OTHER PUBLICATIONS

Dobrynin, A.V., "Phase coexistence in random copolymers" J. Chem. Phys. 107 (21) Dec. 1, 1997.
Potemkin, I.I., "Microphase separation in correlated random copolymers: Mean-field theory and fluctuation corrections", Physical review vol. 57, No. 6, Jun. 1998.
Randall. J. C., "A Review of high resolution liquid 13carbon nuclear magnetic resonance characterizations of ethylene-based polymers", JMS-Rev. Macromol. Chem. Phys., C29(2 & 3), 201-317 (1989).

*Primary Examiner* — Peter Szekely
(74) *Attorney, Agent, or Firm* — Whyte Hirschboeck Dudek S.C.

(57) ABSTRACT

A halogen-free, flame retardant composition comprises thermoplastic polyurethane, olefin block copolymer, carbonyl-containing olefin polymer compatibilizer, and flame retardant package comprising bisphenol-A bis(diphenyl phosphate) and/or resorcinol bis(diphenyl phosphate), a nitrogen/phosphorus based, halogen-free flame retardant, and epoxidized novolac. The composition that will not only be processed easily to make a wire or cable sheath but also pass both the VW-1 flame retardancy test and the UL1581 heat deformation test at 150° C. exhibits good tensile and flexibility properties.

8 Claims, No Drawings

HALOGEN FREE, FLAME RETARDANT COMPOSITIONS FOR WIRE AND CABLE APPLICATIONS

FIELD OF THE INVENTION

This invention relates to wire and cable. In one aspect the invention relates to wire and cable sheathings, e.g., protective jackets and insulation, while in another aspect, the invention relates to such sheathings that are flame retardant and halogen-free. In one aspect the invention relates to compositions from which such sheathings are made.

BACKGROUND OF THE INVENTION

One of the key challenges in preparing wire and cable sheathing is to achieve a good balance between tensile properties, flame retardant performance and heat deformation. One particularly stringent specification is a balance of flame retardancy so as to pass the VW-1 test while at the same time maintaining a heat deformation ratio of less than (<) 50% at 150° C. (UL1581-2001). Some compositions have been identified that can meet this specification, but at a cost of other important properties. For example, cable sheathing made from a composition comprising a thermoplastic polyurethane (TPU), aluminum trihydrate (ATH) and resorcinol bis(diphenyl phosphate) (RDP) can meet this specification but it is expensive, has a high, e.g., greater than 1.4 g/cm$^3$, density (ASTM D792) and a low, e.g., less than 0.76 G$\Omega$·m, insulation resistance (UL62). Another cable sheathing that meets this specification is made from a composition comprising TPU, crosslinked ethylene vinyl acetate (EVA) and a conventional flame retardant such as ATH, but this composition is relatively difficult to process. Of continuing interest to manufacturers of wire and cable sheathing are compositions, particularly halogen-free compositions, which afford a good balance of mechanical properties and flame retardancy with good processability.

SUMMARY OF THE INVENTION

In one embodiment the invention is a halogen-free, flame retardant composition that will process easily to make a wire and cable sheathing that will pass both the VW-1 flame retardancy test and the UL1581-2001 heat deformation test at 150° C. while at the same time exhibiting good tensile and flexibility properties. In one embodiment the inventive composition comprises:

A. Thermoplastic polyurethane,

B. Olefin block copolymer (OBC),

C. Carbonyl-containing olefin polymer compatibilizer, and

D. Flame retardant comprising (1) bisphenol-A bis(diphenyl phosphate) (BPADP) or RDP, (2) a nitrogen/phosphorus based, halogen-free flame retardant, e.g., FP2100J, and (3) epoxidized novolac.

In one embodiment, the combination of OBC and carbonyl-containing olefin polymer comprises less than 30 weight percent of the total polymer matrix. In one embodiment the carbonyl-containing olefin polymer is at least one of a maleic anhydride-grafted (MAH-g) olefin elastomer and an MAH-g-OBC.

The wire and cable sheathing made from the compositions of this invention exhibit synergistic balance of flame retardancy and tensile properties.

DETAILED DESCRIPTION OF THE PREFERRED EMBODIMENT

Definitions

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of various components in the inventive composition, the amount of the various components in the flame retardant component of the inventive compositions, and the various characteristics and properties by which these compositions and the wire and cable sheathing made from these compositions are defined.

"Wire" and like terms mean a single strand of conductive metal, e.g., copper or aluminum, or a single strand of optical fiber.

"Cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Composition" and like terms mean a mixture or blend of two or more components.

"Polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

The term "polymer" (and like terms) is a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Olefin-based polymer" and like terms means a polymer containing, in polymerized form, a majority weight percent of an olefin, for example ethylene or propylene, based on the total weight of the polymer. Nonlimiting examples of olefin-based polymers include ethylene-based polymers and propylene-based polymers.

"Halogen-free" and like terms mean that the compositions of this invention are without or substantially without halogen content, i.e., contain less than 2000 mg/kg of halogen as measured by ion chromatography (IC) or a similar analytical method. Halogen content of less than this amount is considered inconsequential to the efficacy of the composition as a wire or cable covering.

"Intumescent flame retardant" and like terms means a flame retardant that yields a foamed char formed on a surface of a polymeric material during fire exposure.

The compositions of this invention comprise (A) a polymer matrix, (B) a flame retardant package, and, optionally, (C) an additive package. The polymer matrix comprises (1) thermoplastic polyurethane, (2) olefin block inter- or copolymer, and (3) compatibilizer. The flame retardant package comprises (1) BPADP and/or RDP, (2) FP 2100J, and (3) epoxidized novolac resin. The optional additive package comprises at least one of the conventional additives for compositions from which flame retardant wire and cable sheaths are prepared, e.g., antioxidants, UV stabilizers, colorants, processing aids, fillers and the like.

Polymer Matrix

Thermoplastic Polyurethane (TPU)

The thermoplastic polyurethane used in the practice of this invention is the reaction product of a polyisocyanate (typically a di-isocyanate), one or more polymeric diol(s), and optionally one or more difunctional chain extender(s). "Thermoplastic" as here used describes a polymer that (1) has the ability to be stretched beyond its original length and retract to substantially its original length when released, and (2) softens when exposed to heat and returns to substantially its original condition when cooled to room temperature.

The TPU may be prepared by the prepolymer, quasi-prepolymer, or one-shot methods. The isocyanate forms a hard segment in the TPU and may be an aromatic, an aliphatic, or a cycloaliphatic isocyanate and combinations of two or more of these compounds. One non-limiting example of a structural unit derived from a di-isocyanate (OCN—R—NCO) is represented by formula (I):

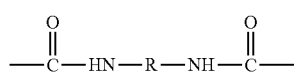

(I)

in which R is an alkylene, cycloalkylene, or arylene group. Representative examples of these di-isocyanates can be found in U.S. Pat. Nos. 4,385,133, 4,522,975 and 5,167,899. Nonlimiting examples of suitable di-isocyanates include 4,4'-di-isocyanatodipheny-1-methane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, 2,4-toluene di-isocyanate, and 4,4'-di-isocyanato-diphenylmethane.

The polymeric diol forms soft segments in the resulting TPU. The polymeric diol can have a molecular weight (number average) in the range, for example, from 200 to 10,000 g/mole. More than one polymeric diol can be employed. Nonlimiting examples of suitable polymeric diols include polyether diols (yielding a "polyether TPU"); polyester diols (yielding "polyester TPU"); hydroxy-terminated polycarbonates (yielding a "polycarbonate TPU"); hydroxy-terminated polybutadienes; hydroxy-terminated polybutadiene-acrylonitrile copolymers; hydroxy-terminated copolymers of dialkyl siloxane and alkylene oxides, such as ethylene oxide, propylene oxide; natural oil diols, and any combination thereof. One or more of the foregoing polymeric diols may be mixed with an amine-terminated polyether and/or an amino-terminated polybutadiene-acrylonitrile copolymer.

The difunctional chain extender can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexanedimethanol; hydroquinonebis-(hydroxyethyl)ether; cyclohexylenediols (1,4-, 1,3-, and 1,2-isomers), isopropylidenebis(cyclohexanols); diethylene glycol, dipropylene glycol, ethanolamine, N-methyl-diethanolamine, and the like; and mixtures of any of the above. As noted previously, in some cases, minor proportions (less than about 20 equivalent percent) of the difunctional extender may be replaced by trifunctional extenders, without detracting from the thermoplasticity of the resulting TPU; illustrative of such extenders are glycerol, trimethylolpropane, and the like.

The chain extender is incorporated into the polyurethane in amounts determined by the selection of the specific reactant components, the desired amounts of the hard and soft segments, and the index sufficient to provide good mechanical properties, such as modulus and tear strength. The polyurethane compositions can contain, for example, from 2 to 25, preferably from 3 to 20 and more preferably from 4 to 18, wt % of the chain extender component.

Optionally, small amounts of monohydroxyl functional or monoamino functional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 weight percent of the entire reaction mixture leading to the polyurethane composition.

The equivalent proportions of polymeric diol to said extender can vary considerably depending on the desired hardness for the TPU product. Generally speaking, the equivalent proportions fall within the respective range of from about 1:1 to about 1:20, preferably from about 1:2 to about 1:10. At the same time the overall ratio of isocyanate equivalents to equivalents of active hydrogen containing materials is within the range of 0.90:1 to 1.10:1, and preferably, 0.95:1 to 1.05:1.

In one embodiment the TPU is a polyester-based polyurethane with a Shore A hardness of 70-95 as measured by ASTM D2240.

Nonlimiting examples of suitable TPUs include the PELLETHANE™ thermoplastic polyurethane elastomers available from the Lubrizol Corporation; ESTANE™ thermoplastic polyurethanes, TECOFLEX™ thermoplastic polyurethanes, CARBOTHANE™ thermoplastic polyurethanes, TECOPHILIC™ thermoplastic polyurethanes, TECOPLAST™ thermoplastic polyurethanes, and TECOTHANE™ thermoplastic polyurethanes, all available from Noveon; ELASTOLLANT™ thermoplastic polyurethanes and other thermoplastic polyurethanes available from BASF; and commercial thermoplastic polyurethanes available from Bayer, Huntsman, the Lubrizol Corporation and Merquinsa.

Olefin Block Copolymer (OBC)

"Olefin block copolymer", olefin block interpolymer", "multi-block interpolymer", "segmented interpolymer" and like terms refer to a polymer comprising two or more chemically distinct regions or segments (referred to as "blocks") preferably joined in a linear manner, that is, a polymer comprising chemically differentiated units which are joined end-to-end with respect to polymerized olefinic, preferable ethylenic, functionality, rather than in pendent or grafted fashion. In a preferred embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the multi-block interpolymers used in the practice of this invention are characterized by unique distributions of both polymer polydispersity (PDI or Mw/Mn or MWD), block length distribution, and/or block number distribution, due, in a preferred embodiment, to the effect of the shuttling agent(s) in combination with multiple catalysts used in their preparation. More specifically, when produced in a continuous process, the polymers desirably possess PDI from 1.7 to 3.5, preferably from 1.8 to 3, more preferably from 1.8 to 2.5, and most preferably from 1.8 to 2.2. When produced in a batch or semi-batch process, the polymers desirably possess PDI from 1.0 to 3.5, preferably from 1.3 to 3, more preferably from 1.4 to 2.5, and most preferably from 1.4 to 2.

The term "ethylene multi-block interpolymer" means a multi-block interpolymer comprising ethylene and one or more interpolymerizable comonomers, in which ethylene comprises a plurality of the polymerized monomer units of at least one block or segment in the polymer, preferably at least 90, more preferably at least 95 and most preferably at least 98, mole percent of the block. Based on total polymer weight, the ethylene multi-block interpolymers used in the practice of the present invention preferably have an ethylene content from 25 to 97, more preferably from 40 to 96, even more preferably from 55 to 95 and most preferably from 65 to 85, percent.

Because the respective distinguishable segments or blocks formed from two of more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In a preferred embodiment the quantity of extractable polymer using either a dialkyl ether or an alkane-solvent is less than 10, preferably less than 7, more preferably less than 5 and most preferably less than 2, percent of the total polymer weight.

In addition, the multi-block interpolymers used in the practice of the invention desirably possess a PDI fitting a Schutz-Flory distribution rather than a Poisson distribution. The use of the polymerization process described in WO 2005/090427 and U.S. Ser. No. 11/376,835 results in a product having both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In a further embodiment, the polymers of the invention, especially those made in a continuous, solution polymerization reactor, possess a most probable distribution of block lengths. In one embodiment of this invention, the ethylene multi-block interpolymers are defined as having:

(A) Mw/Mn from about 1.7 to about 3.5, at least one melting point, Tm, in degrees Celsius, and a density, d, in grams/cubic centimeter, where in the numerical values of Tm and d correspond to the relationship $$Tm > -2002.9 + 4538.5(d) - 2422.2(d)^2, \text{ or}$$

(B) Mw/Mn from about 1.7 to about 3.5, and is characterized by a heat of fusion, $\Delta H$ in J/g, and a delta quantity, $\Delta T$, in degrees Celsius defined as the temperature difference between the tallest DSC peak and the tallest CRYSTAF peak, wherein the numerical values of $\Delta T$ and $\Delta H$ have the following relationships:

$$\Delta T > -0.1299(\Delta H) + 62.81 \text{ for } \Delta H \text{ greater than zero and up to 130 J/g}$$

$$\Delta T > 48 \text{ C for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30 C; or (C) Elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ or}$$

(D) Has a molecular weight fraction which elutes between 40 C and 130 C when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; or (E) Has a storage modulus at 25 C, G'(25 C), and a storage modulus at 100 C, G'(100 C), wherein the ratio of G'(25 C) to G'(100 C) is in the range of about 1:1 to about 9:1.

The ethylene/α-olefin interpolymer may also have:

(F) Molecular fraction which elutes between 40 C and 130 C when fractionated using TREF, characterized in that the fraction has a block index of at least 0.5 and up to about 1 and a molecular weight distribution, Mw/Mn, greater than about 1.3; or (G) Average block index greater than zero and up to about 1.0 and a molecular weight distribution, Mw/Mn greater than about 1.3.

Suitable monomers for use in preparing the ethylene multi-block interpolymers used in the practice of this present invention include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

Other ethylene multi-block interpolymers that can be used in the practice of this invention are elastomeric interpolymers of ethylene, a $C_{3-20}$ α-olefin, especially propylene, and, optionally, one or more diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. One particularly preferred α-olefin is propylene. The propylene based polymers are generally referred to in the art as EP or EPDM polymers. Suitable dienes for use in preparing such polymers, especially multi-block EPDM type-polymers include conjugated or non-conjugated, straight or branched chain-, cyclic- or polycyclic dienes containing from 4 to 20 carbon atoms. Preferred dienes include 1,4-pentadiene, 1,4-hexadiene, 5-ethylidene-2-norbornene, dicyclopentadiene, cyclohexadiene, and 5-butylidene-2-norbornene. One particularly preferred diene is 5-ethylidene-2-norbornene.

Because the diene containing polymers contain alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

The ethylene multi-block interpolymers useful in the practice of this invention have a density of less than 0.90, preferably less than 0.89, more preferably less than 0.885, even more preferably less than 0.88 and even more preferably less than 0.875, g/cc. The ethylene multi-block interpolymers typically have a density greater than 0.85, and more preferably greater than 0.86, g/cc. Density is measured by the procedure of ASTM D-792. Low density ethylene multi-block interpolymers are generally characterized as amorphous, flexible and having good optical properties, e.g., high transmission of visible and UV-light and low haze.

The ethylene multi-block interpolymers useful in the practice of this invention typically have a melt flow rate (MFR) of 1-10 grams pr 10 minutes (g/10 min) as measured by ASTM D1238 (190° C./2.16 kg).

The ethylene multi-block interpolymers useful in the practice of this invention have a 2% secant modulus of less than about 150, preferably less than about 140, more preferably less than about 120 and even more preferably less than about 100, mPa as measured by the procedure of ASTM D-882-02. The ethylene multi-block interpolymers typically have a 2% secant modulus of greater than zero, but the lower the modulus, the better the interpolymer is adapted for use in this invention. The secant modulus is the slope of a line from the origin of a stress-strain diagram and intersecting the curve at a point of interest, and it is used to describe the stiffness of a material in the inelastic region of the diagram. Low modulus ethylene multi-block interpolymers are particularly well adapted for use in this invention because they provide stability under stress, e.g., less prone to crack upon stress or shrinkage.

The ethylene multi-block interpolymers useful in the practice of this invention typically have a melting point of less than about 125. The melting point is measured by the differential scanning calorimetry (DSC) method described in WO 2005/090427 (US2006/0199930). Ethylene multi-block interpolymers with a low melting point often exhibit desirable flexibility and thermoplasticity properties useful in the fabrication of the wire and cable sheathings of this invention.

The ethylene multi-block interpolymers used in the practice of this invention, and their preparation and use, are more fully described in U.S. Pat. Nos. 7,579,408, 7,355,089, 7,524,911, 7,514,517, 7,582,716 and 7,504,347.

Carbonyl-Containing-Olefin Polymer Compatibilizer

The carbonyl-containing olefin polymer component of the inventive composition serves as a compatibilizer between the polymer matrix and the flame retardant components of the composition. As here used, "carbonyl-containing" includes olefin polymers in which the carbonyl functionality (C=O) is either grafted to the polymer backbone or copolymerized into the polymer backbone. Grafted carbonyl functionality can originate from any unsaturated organic compound containing at least one site of ethylenic unsaturation (e.g. at least one double bond), and at least one carbonyl group that will graft to an olefin-based polymer. Representative unsaturated organic compounds that contain at least one carbonyl group are the ethylenically unsaturated carboxylic acids, anhydrides, esters and their salts. Preferably, the organic compound contains ethylenic unsaturation conjugated with the carbonyl group. Representative compounds include maleic, fumaric, acrylic, methacrylic, itaconic, crotonic, .alpha.-methyl crotonic, cinnamic, and the like, acids and their anhydride, ester and salt derivatives, if any. Maleic anhydride is the preferred unsaturated organic compound containing at least one site of ethylenic unsaturation and at least one carbonyl group.

The unsaturated organic compound content of the grafted olefin-based polymer is typically at least 0.01 wt %, preferably at least 0.1 wt %, and more preferably at least 0.5 wt %, based on the combined weight of the polymer and the organic compound. The maximum amount of unsaturated organic compound content can vary to convenience, but typically it does not exceed 10 wt %, more typically it does not exceed 5 wt %, and even more typically it does not exceed 2 wt %.

The unsaturated organic compound can be grafted to the olefin-based polymer by any known technique, such as those taught in U.S. Pat. Nos. 3,236,917 and 5,194,509. For example, in the '917 patent the base polymer is introduced into a two-roll mixer and mixed at a temperature of 60° C. The unsaturated organic compound is then added along with a free radical initiator, such as, for example, benzoyl peroxide, and the components are mixed at 30° C. until the grafting is completed. In the '509 patent, the procedure is similar except that the reaction temperature is higher, e.g. 210 to 300° C., and a free radical initiator is not used.

An alternative and preferred method of grafting is taught in U.S. Pat. No. 4,950,541 by using a twin-screw devolatilizing extruder as the mixing apparatus. The olefin-based polymer and unsaturated organic compound are mixed and reacted within the extruder at temperatures at which the reactants are molten and in the presence of a free radical initiator. Preferably, the unsaturated organic compound is injected into a zone maintained under pressure within the extruder.

Representative of the olefin polymers in which the carbonyl functionality is copolymerized into the polymer backbone are those polymers comprising units derived from an olefin, e.g., ethylene, and an alpha,beta-unsaturated carbonyl comonomer, e.g., acrylic acid or methacrylic acid (EAA or EMAA) and their ionomers (e.g. their metal salts), ethylene and vinyl acetate (EVA) and its derivative ethylene vinyl alcohol (EVOH), ethylene and carbon monoxide (ECO), ethylene/propylene and carbon monoxide (EPCO), ethylene/carbon monoxide/acrylic acid terpolymer (ECOAA), and the like. With respect to EAA and EMAA (and their derivatives), these materials are usually produced by the free radical copolymerization of ethylene with acrylic acid or methacrylic acid. The resulting interpolymers have carbonyl groups (as part of carboxylic acid groups) along the backbone and/or side chains of the interpolymers which in the case of their ionomers, can be subsequently neutralized or partially neutralized with a base. Preferably, these interpolymers contain between 3 and 20, more preferably between 5 and 15, and most preferably between 8 and 12 percent by weight of acrylic acid or methacrylic acid monomer units in the polymer chain. The melt index of these interpolymers is typically in the range of 0.5 to 1500, preferably in the range of 5 to 300 g/10 min, as determined by ASTM D-1238 Procedure A, Conditions E and N, at a temperature of 190° C.

The compatibilizer used in the practice of this invention typically has a density as measured by ASTM D792 of 0.8 to 0.95, more typically 0.8-0.9, grams per cubic centimeter (g/cc).

The olefinic interpolymers that are grafted with the unsaturated organic compound containing at least one site of ethylenic unsaturation (MAH-g) include but are not limited to polyolefin elastomers, flexomers and plastomers. Preferably, the olefinic interpolymer is an ethylene interpolymer that comprises at least 10, preferably at least 50 and more preferably at least 70, wt % units derived from ethylene based on the weight of the olefinic interpolymer.

Examples of olefinic interpolymers useful in the practice of this invention include very low density polyethylene (VLDPE), homogeneously branched, linear ethylene/α-olefin copolymers (e.g. TAFMER® by Mitsui Petrochemicals Company Limited and EXACT® by DEXPlastomers), and homogeneously branched, substantially linear ethylene/α-olefin polymers (e.g., AFFINITY® polyolefin plastomers and ENGAGE® polyolefin elastomers available from The Dow Chemical Company). The substantially linear ethylene copolymers are more fully described in U.S. Pat. Nos. 5,272, 236, 5,278,272 and 5,986,028.

Other olefinic interpolymers useful in the present invention include heterogeneously branched ethylene-based interpolymers including, but are not limited to, linear medium density polyethylene (LMDPE), linear low density polyethylene (LLDPE), and ultra low density polyethylene (ULDPE). Commercial polymers include DOWLEX™ polymers, ATTANE™ polymer and FLEXOMER™ polymers (all from The Dow Chemical Company), and ESCORENE™ and EXCEED™ polymers (both from Exxon Mobil Chemical).

Still other olefinic interpolymers include multi-block or segmented copolymers as described above.

The ethylene interpolymers useful in the present invention include ethylene/α-olefin interpolymers having a α-olefin content typically of at least 5, more typically of at least 15 and even more typically of at least about 20, wt % based on the weight of the interpolymer. These interpolymers typically have an α-olefin content of less than 90, more typically less than 75 and even more typically less than about 50, wt % based on the weight of the interpolymer. The α-olefin content is measured by $^{13}C$ nuclear magnetic resonance (NMR) spectroscopy using the procedure described in Randall (*Rev. Macromol. Chem. Phys.*, C29 (2&3)).

The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, ethylene/propylene/diene monomer (EPDM) and ethylene/butene/styrene. The copolymers can be random or blocky.

Additional olefinic interpolymers useful in the practice of this invention include the VERSIFY® propylene-based polymers available from The Dow Chemical Company, and the VISTAMAXX® propylene polymers available from Exxon-Mobil Chemical Company, at least those VERSIFY® AND VISTAMAXX® propylene polymers with a content of units derived from propylene of less than 85 mol %. A discussion of various other polypropylene polymers is contained in *Modern Plastics Encyclopedia*/89, mid October 1988 Issue, Volume 65, Number 11, pp. 6-92.

Relative Amounts of TPU, OBC and Compatibilizer

The TPU and OBC are blended with one another in any convenient manner to form a polymer matrix in which the TPU is the continuous phase and the OBC is the discontinuous or dispersed phase. By blending OBC resins with TPU lowers the density of the inventive composition relative to a similar composition in which the OBC is replaced with a like amount of TPU. Lower density compositions should have a lower price after normalization.

The relative amounts of TPU, OBC and compatibilizer in the matrix can vary widely, but typically the TPU comprises 50 to 95, more typically 70 to 90, weight percent (wt %) of the matrix, the OBC comprises 5 to 50, more typically 10-30, wt % of the matrix, and the compatibilizer comprises 1 to 15, more typically 3 to 6, wt % of the matrix.

Flame Retardant Package

The flame retardant package of this invention comprises bisphenol-A bis(diphenyl phosphate) (BPADP) and/or resorcinol bis(diphenyl phosphate) (RDP), (2) a nitrogen/phosphorus based, halogen-free flame retardant, and (3) epoxidized novolac. The BPADP and RDP are known flame retardants and commercially available from Adeka Palmarole and Supresta, respectively. The BPADP/RDP component of the flame retardant package can comprise from 0 to 100 wt % BPADP and from 0 to 100 wt % RDP. Typically this component of the package comprises one or the other of BPADP and RDP.

Representative of the nitrogen/phosphorus-based, halogen-free flame retardant is FP-2100J available from Adeka Palmarole under the designation ADK STAB FP-2100J.

The epoxidized novolac resin component of the flame retardant package is also a well known compound, e.g., U.S. Pat. No. 3,214,409 provides a description of the compound, its preparation and certain of its uses, and it is commercially available from, among others, The Dow Chemical Company.

Typically the BPADP/RDP component of the flame retardant package comprises 5 to 20, more typically 10 to 15, wt % of the composition, i.e., the polymer matrix, flame retardant package and additive package (if any). Typically the nitrogen/phosphorus, halogen-free component of the flame retardant package comprises 30 to 60, more typically 40 to 50, wt % of the composition. Typically the epoxidized novolac resin comprises 0.1 to 10, more typically 1 to 3, wt % of the composition.

The flame retardant package of this invention in combination with the polymer matrix results in a composition that exhibits a synergistic balance of flame retardancy and tensile properties. Among these properties are a tensile stress larger than 7 MegaPascals (MPa) and a tensile elongation larger than 200% (ASTM D638), a heat deformation ratio less than 50% at 150° C. (UL1581-2001), flame retardancy sufficient to pass the VW-1 test (UL1581) and good flexibility and softness (Shore A hardness of less than 90 as measured by ASTM D2240).

Optional Additive Package

The compositions of this invention can contain one or more additives such as, but not limited to, antioxidants (e.g., hindered phenols such as, for example, IRGANOX™ 1010 a registered trademark of Ciba Specialty Chemicals), phosphites (e.g., IRGAFOS™ 168 a registered trademark of Ciba Specialty Chemicals), UV stabilizers, light stabilizers (such as hindered amines), plasticizers (such as dioctylphthalate or epoxidized soy bean oil), thermal (melt processing) stabilizers, mold release agents, waxes (such as polyethylene waxes), processing aids (such as oils, organic acids such as stearic acid, metal salts of organic acids), and colorants or pigments, to the extent that these additives do not interfere with the desired physical or mechanical properties of the articles made from the compositions of the present invention. These additives are used in known amounts and in known ways, but typically the additive package comprises, if present at all, greater than zero, e.g., 0.01, to 2, more typically 0.1 to 1, wt % of the final composition. Due to the relatively large amount of the flame retardant package in the final composition, other fillers, e.g., talc, a carbonate, etc., and/or other fire retardants, e.g., ATH, are typically not included in the final composition.

Compounding/Fabrication

Compounding of the compositions of this invention can be performed by standard means known to those skilled in the art. Examples of compounding equipment are internal batch mixers, such as a Banbury or Bolling internal mixer. Alternatively, continuous single or twin screw mixers can be used, such as a Farrel continuous mixer, a Werner and Pfleiderer twin screw mixer, or a Buss kneading continuous extruder. The type of mixer utilized, and the operating conditions of the mixer, will affect properties of the composition such as viscosity, volume resistivity, and extruded surface smoothness.

The compounding temperature for the TPU, OBC and compatibilizer is typically from the melting point of the OBC, e.g., 120° C., to 220° C., more typically from 160 to 200° C. The compounding temperature of the polymer matrix with the flame retardant and optional additive packages is typically from 120 to 220° C., more typically from 160 to 200° C. The various components of the final composition can be added to and compounded with one another in any order, or simultaneously, but typically the compatibilizer is first compounded with the OBC and the TPU is first compounded with one or more of the components of the flame retardant package, and then the two mixtures along with any remaining components of the flame retardant package and any additives are compounded with one another.

In some embodiments the additives are added as a premixed masterbatch. Such masterbatches are commonly formed by dispersing the additives, either separately or together, into an inert plastic resin, e.g., one of the plastic matrix components or a low density polyethylene. Masterbatches are conveniently formed by melt compounding methods.

Articles of Manufacture

In one embodiment, the polymer composition of this invention can be applied as a covering to a cable, e.g., like a sheath or insulation layer, in known amounts and by known methods (for example, with the equipment and methods described in U.S. Pat. Nos. 5,246,783 and 4,144,202). Typically, the polymer composition is prepared in a reactor-extruder equipped with a cable-coating die and after the components of the composition are formulated, the composition is extruded over the cable as the cable is drawn through the die. The sheath is then typically subjected to a cure period which takes place at temperatures from ambient up to but below the melting point of the composition until the article has reached the desired degree of crosslinking. Cure may begin in the reactor-extruder.

Other articles of manufacture that can be prepared from the polymer compositions of this invention, particularly under high pressure and/or elevated moisture conditions, include fibers, ribbons, sheets, tapes, pellets, tubes, pipes, weatherstripping, seals, gaskets, foams, footwear and bellows. These articles can be manufactured using known equipment and techniques.

The invention is described more fully through the following examples. Unless otherwise noted, all parts and percentages are by weight.

SPECIFIC EMBODIMENTS

Materials

The following materials are used in the following examples. The materials are dried or otherwise treated, if at all, as described.

- A. PELLETHANE™ 2135-90 AE polyether thermoplastic polyurethane (available from Lubrizol Advanced Materials). Before using the TPU samples are dried at 90° C. for at least 6 hours under vacuum.
- B. INFUSE 9100 OBC (available from The Dow Chemical Company). Before using the OBC samples are dried at 47° C. for at least 6 hrs under vacuum.

C. Bisphenol-A bis(diphenyl phosphate) (BPADP) is obtained from Adeka Palmarole of the grade name FP600, and it is used as received.
D. Resorcinol bis(diphenyl phosphate) (RDP) is obtained from Supresta of the grade name FYROLFLEX®RDP.
E. Intumescent FR chemical FP-2100J comprising piperazine pyrophosphate is obtained from Adeka Palmarole and used as received.
F. Aluminum Trihydrate (ATH) with a low bulk density of 0.2-0.5 g/cm$^3$ is obtained from Showa Chemical of Japan.
G. Epoxidized novolac resin is selected as solvent free DEN-438 with epoxide equivalent weight (EEW) of 176-181 (available from The Dow Chemical Company).
H. AMPLIFY™ GR216 (maleic anhydride grafted polyolefin elastomer, available from The Dow Chemical Company). The samples are dried at 40° C. under vacuum before using.
I. Maleic anhydride grafted INFUSE D9817 (available from The Dow Chemical Company). Samples are dried at 47° C. under vacuum before using.

Compounding

Step 1: OBC/Compatibilizer/FR Mixture

OBC is manually mixed with compatibilizer pellets, and then loaded into a Haake Mixer for plasticization. Temperature is set at 150° C. with a shear speed of 60 revolutions per minute (rpm). An admixture of FP2100J and BPADP/RDP is fed into the mixing zone within 2 minutes. Compounding continues for another 6 minutes. The obtained polymer compositions are cut into small pieces for further compounding.

Step 2: TPU/FR Mixture

TPU is firstly fed into the Haake Mixer for plasticization, then an admixture of FP2100J and BPADP/RDP is fed into the mixing zone for compounding which continues for an additional 6 minutes. The obtained polymer compositions are cut into small pieces for further compounding.

Step 3: TPU/OBC/FR Composition

The polymer compositions obtained from Steps 1 and 2 are loaded into the Haake Mixer at 170° C. with a shear speed of 100 rpm. Compounding continues for 6-8 minutes.

Polymer compounds made by different processes shown above are pressed into plaques by using a hot presser at 180-185° C. The plaques with a thickness of about 1.5 mm are then subjected to a cold-presser under the same pressure and at room temperature for 5 minutes. Samples are then used for the following tests.

Tests

Heat Deformation

Heat deformation testing is conducted according to UL 1581-2001. For each formulation two parallel sample plaques are placed into an oven and preheated at 150° C. for one hour. The pre-heated samples are pressed with the same loading at 150° C. for one hour. Afterwards the pressed samples, without removal of weights, are placed in an ASTM room with setting temperature at 23° C. for additional one hour. The change of the thickness of the sample plaques are recorded and heat deformation ratio is calculated according to $$HD\% = (D_0 - D_1)/D_0 * 100\%$$

in which $D_0$ represents the original sample thickness and $D_1$ represents the sample thickness after the deformation process. Calculated deformation ratios for the two parallel samples are averaged.

Tensile

Tensile tests are conducted on an INSTRON 5565 tensile tester. Plaques are cut into bell-shape specimens using a die cutter. Tensile tests are carried out according to ASTM D638 at room temperature. The speed is 50 mm/min.

Surface Hardness

Surface hardness tests are conducted on a SHORE S1A DIGITAL DUROMETER instrument according to ASTM D2240 in an ASTM room. Samples with thickness of 6 mm are used and three parallel testing results for one formulated sample are recorded and averaged.

Flame Retardancy

Mimic VW-1 FR test is conducted in an UL94 chamber. Test specimens are limited to the dimension of 200*2.7*1.9 mm. The specimens are hung on a clamp with longitudinal axis vertical by applying 50 g loading on the distal end. One paper flag (2*0.5 cm) is applied on the top of the wire. The distance of flame bottom (highest point of the burner oracle) to the bottom of flag is 18 cm. Flame is applied for 45 continuous seconds. After flame time (AFT), uncharred wire length (UCL), and uncharred flag area percentage (flag uncharred) is recorded during and after combustion. Four or five specimens are tested for each sample. Any of the following constitutes "not pass": (1) cotton under the specimen is ignited, (2) the flag is burned out, and (3) dripping with flame. The results are reported in the following Table.

In all the examples, the loading of the matrix polymers and flame retardant chemicals are maintained to be comparable. Examples CE1-3 are comparative examples, and Examples 1-5 are examples of the invention. Formulation components are reported in weight percent of the composition.

TABLE

Formulations and Testing Results

|  | CE1 | CE2 | CE3 | 1 | 2 | 3 | 4 | 5 |
|---|---|---|---|---|---|---|---|---|
| PELLETHANE 2103-90 | 43 | 30.1 | 34.4 | 30.1 | 30.1 | 30.1 | 30.1 | 30.1 |
| INFUSE ™ 9100 |  | 13.5 | 7.74 | 12.15 | 12.15 | 10.8 | 13.2 | 10.8 |
| MAH-g-OBC |  |  | 0.86 | 1.35 | 1.35 | 2.7 | 3.3 |  |
| AMPLIFY GR216 |  |  |  |  |  |  |  | 2.7 |
| FP2100J | 40 | 41.5 |  | 41.5 | 41.5 | 41.5 | 41.5 | 41.5 |
| ATH |  |  | 41 |  |  |  |  |  |
| BDP | 15 | 13.5 | 14 | 13.5 |  |  |  |  |
| RDP |  |  |  |  | 13.5 | 13.5 | 10.5 | 13.5 |
| Epoxy Novolac | 2 | 1.4 | 2 | 1.4 | 1.4 | 1.4 | 1.4 | 1.4 |
| Stabilizer | 0.4 | 0.4 | 0.4 | 0.4 | 0.4 | 0.4 | 0.4 | 0.4 |

Properties

|  | CE1 | CE2 | CE3 | 1 | 2 | 3 | 4 | 5 |
|---|---|---|---|---|---|---|---|---|
| Surface hardness (Shore A) | N.A | N.A | N.A | 89 | 88 | 88 | 89 | 89 |
| Heat deformation at 150° C. | 21% | 26% | 20% | 27% | 20% | 31% | 27% | 28% |
| Tensile strength/MPa | 11.1 | 8.2 | 9.9 | 8.7 | 7.1 | 7.5 | 6.9 | 7.2 |
| Standard Deviation./MPa | 0.4 | 0.4 | 0.2 | 0.3 | 0.1 | 0.3 | 0.3 | 0.1 |

TABLE-continued

Formulations and Testing Results

|  | CE1 | CE2 | CE3 | 1 | 2 | 3 | 4 | 5 |
|---|---|---|---|---|---|---|---|---|
| Tensile Elongation/% | 349 | 144 | 314 | 206 | 193 | 236 | 202 | 211 |
| Standard Deviation./% | 15 | 9 | 21 | 8 | 14 | 23 | 20 | 22 |
| Mimic VW-1 testing (Pass/Total) | 2/5 | 5/5 | 0/5 | 4/4 | 5/5 | 4/5 | 4/5 | 4/5 |

From the test results the inventive examples displayed overall good balance between tensile elongation and flame retardance performance which could not be achieved by the comparative formulations using either TPU as the matrix, or ATH as the primary flame retardant. The inventive compositions also displayed superior heat deformation performance at 150° C. regarding the required deformation ratio less than 50%.

Comparative Example 1 illustrates the using of TPU as the polymer matrix and FP2100J/BPADP/epoxidized novolac as the flame retardant (FR) package. The formulated composition expresses good heat deformation performance at 150° C. and tensile properties; however, it cannot pass the VW-1 burning test. Comparative Example 2 illustrates the using of TPU/OBC blend as the polymer matrix and FP2100J/BPADP/epoxidized novolac as the FR package. The formulated composition expresses good heat deformation performance at 150° C. and passes the VW-1 burning test; however, it exhibits a significantly lower tensile elongation than the inventive formulations. Comparative Example 3 illustrates the using of TPU/MAH-g-D9817/OBC as the polymer matrix, and ATH/BPADP/epoxidized novolac as FR package. The formulated composition expresses superior heat deformation performance at 150° C. and tensile properties; however, it fails to pass the VW-1 burning test.

The inventive FR compositions with OBC in the formulations shows even better flexibility as compared to only formulations with only TPU as the polymer matrix. Moreover, tensile properties may be further improved by the use of a twin-screw compounding or injection molding process in place of compounding with a Haake Mixer.

Although the invention has been described with certain detail through the preceding specific embodiments, this detail is for the primary purpose of illustration. Many variations and modifications can be made by one skilled in the art without departing from the spirit and scope of the invention as described in the following claims.

The invention claimed is:
1. A composition comprising:
 A. Thermoplastic polyurethane (TPU),
 B. Olefin block copolymer (OBC),
 C. Carbonyl-containing olefin polymer compatibilizer, and
 D. Flame retardant package comprising (1) at least one of bisphenol-A bis(diphenyl phosphate) (BPADP) or resorcinol bis(diphenyl phosphate (RDP), (2) a nitrogen/phosphorus based, halogen-free flame retardant, and (3) epoxidized novolac.
2. The composition of claim 1 in which the TPU, OBC and compatibilizer comprise a polymer matrix in which the flame retardant package is dispersed, and the combination of OBC and carbonyl-containing polymer comprises less than 30 weight percent of the polymer matrix.
3. The composition of claim 2 in which the TPU is either polyester or polyether-based polyurethane, the OBC is an ethylene multi-block copolymer, and the carbonyl-containing olefin polymer is at least one of an a maleic anhydride grafted olefin elastomer or a maleic anhydride grafted olefin block copolymer.
4. The composition of claim 3 in which the BPADP/RDP component of the flame retardant package comprises 5 to 20 wt % of the composition, the nitrogen/phosphorus, halogen-free component of the flame retardant package comprises 30 to 60 wt % of the composition, and the epoxidized novolac resin comprises 0.1 to 10 wt % of the composition.
5. The composition of claim 1 further comprising at least one of an antioxidant, UV stabilizer, light stabilizer, plasticizer, thermal (melt processing) stabilizer, mold release agent, wax, processing aid, colorant or pigment.
6. The composition of claim 1 in which the flame retardant package comprises only one of BPADP and RDP.
7. The composition of claim 1 in which the compatibilizer is a maleic anhydride grafted polyolefin elastomer with a density of 0.8 to 0.95 g/cc, and the maleic anhydride content of the compatibilizer is 0.1 to 5 weight percent.
8. A wire or cable sheath made from the composition of claim 1.

* * * * *